United States Patent
Kachare et al.

(10) Patent No.: US 10,394,746 B2
(45) Date of Patent: Aug. 27, 2019

(54) SYSTEM AND METHOD FOR PROVIDING NEAR STORAGE COMPUTE USING A BRIDGE DEVICE

(71) Applicant: Samsung Electronics Co., Ltd., Suwon-si, Gyeonggi-do (KR)

(72) Inventors: Ramdas P Kachare, Pleasanton, CA (US); Fred Worley, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/944,682

(22) Filed: Apr. 3, 2018

(65) Prior Publication Data
US 2019/0108158 A1 Apr. 11, 2019

Related U.S. Application Data

(60) Provisional application No. 62/571,064, filed on Oct. 11, 2017, provisional application No. 62/571,061, filed on Oct. 11, 2017.

(51) Int. Cl.
G06F 13/42 (2006.01)
H04L 12/931 (2013.01)
G06N 20/00 (2019.01)

(52) U.S. Cl.
CPC ...... G06F 13/4234 (2013.01); G06F 13/4221 (2013.01); G06N 20/00 (2019.01); H04L 49/356 (2013.01); G06F 2213/0008 (2013.01); G06F 2213/0026 (2013.01)

(58) Field of Classification Search
CPC . G06F 13/4234; G06F 13/4221; H04L 49/356
USPC .......................................................... 710/315
See application file for complete search history.

(56) References Cited

U.S. PATENT DOCUMENTS

| | | | |
|---|---|---|---|
| 7,526,619 B1 * | 4/2009 | Overby | G06F 3/0607 711/112 |
| 8,825,940 B1 * | 9/2014 | Diggs | G06F 13/28 711/103 |
| 8,995,981 B1 * | 3/2015 | Aginsky | G08C 17/02 455/419 |
| 9,342,448 B2 | 5/2016 | Fitch et al. | |
| 9,785,356 B2 | 10/2017 | Huang | |
| 9,934,173 B1 * | 4/2018 | Sakalley | G06F 13/1673 |
| 2011/0072209 A1 * | 3/2011 | Lund | G06F 13/14 711/114 |

(Continued)

OTHER PUBLICATIONS

Minturn et al., "Under the Hood with NVMe over Fabrics," SNIA Ethernet Storage Forum, Dec. 15, 2015, pp. 1-47.

*Primary Examiner* — Christopher B Shin
(74) *Attorney, Agent, or Firm* — Innovation Counsel LLP

(57) ABSTRACT

A bridge device includes: a first interface configured to receive a first set of commands from an application running on a host computer; one or more command processors, each of the one or more command processors being configured to translate the first set of commands and generate a second set of commands based on the first set of commands; a second interface configured to provide the second set of commands to a data storage device; and a computing processor configured to issue an internal command to fetch data from the data storage device and write data to the data storage device in a background mode in an agnostic manner to the host computer while running the application.

20 Claims, 7 Drawing Sheets

(56) References Cited

U.S. PATENT DOCUMENTS

| | | | | |
|---|---|---|---|---|
| 2012/0173792 | A1* | 7/2012 | Lassa | G06F 9/4843 |
| | | | | 711/103 |
| 2016/0170903 | A1* | 6/2016 | Kanno | G06F 12/0246 |
| | | | | 711/103 |
| 2016/0293274 | A1* | 10/2016 | Schuh | G06F 12/0246 |
| 2017/0286363 | A1* | 10/2017 | Joshua | G06F 15/17331 |
| 2018/0032462 | A1* | 2/2018 | Olarig | G06F 13/4022 |
| 2018/0095911 | A1* | 4/2018 | Ballapuram | G06F 13/1668 |
| 2018/0157444 | A1* | 6/2018 | Franciosi | G06F 3/0664 |
| 2018/0253347 | A1* | 9/2018 | Shigeta | G06F 11/0751 |

\* cited by examiner

SYSTEM AND METHOD FOR PROVIDING NEAR STORAGE COMPUTE USING A BRIDGE DEVICE

CROSS-REFERENCE TO RELATED APPLICATION(S)

This application claims the benefits of and priority to U.S. Provisional Patent Application Ser. Nos. 62/571,064 and 62/571,061 filed Oct. 11, 2017, the disclosures of which are incorporated herein by reference in their entirety.

TECHNICAL FIELD

The present disclosure relates generally to data storage systems, and more particularly, to a system and method for providing near storage compute using a bridge device.

BACKGROUND

Solid-state drives (SSDs) are rapidly becoming main storage elements of modern datacenter infrastructure quickly replacing traditional storage devices such as hard disk drives (HDDs). SSDs offer low latency, high data read/write throughput, and reliable persistent storage of user data. Non-volatile memory express (NVMe) over fabrics (NVMe-oF) is an emerging technology that allows hundreds and thousands of SSDs to be connected over a fabric network such as Ethernet, Fibre Channel, and Infiniband.

The NVMe-oF protocol enables remote direct-attached storage (rDAS) allowing a large number of NVMe SSDs to be connected to a remote host over the established fabric network. The NVMe-oF protocol also supports remote direct memory access (RDMA) to provide a reliable transport service to carry NVMe commands, data, and responses over the network. iWARP, RoCE v1, and RoCE v2 are some examples of the transport protocols that provide an RDMA service.

A data storage system using disaggregated data storage devices (e.g., NVMe-oF-compatible SSDs, herein also referred to as NVMe-oF SSDs or eSSDs in short) can provide a large storage capacity to an application running on a host computer. The application can collect a large amount of data (big data) from the disaggregated data storage devices and analyze them.

Since the scale of big data processing is very large, the infrastructure to perform meaningful big data mining can be cost prohibitive, requiring heavy computing resources, large system memories, a high bandwidth network, as well as large and high-performance data storage devices for storing the big data. It would be desirable to offload some data processing mining tasks from the host computer to the data storage devices and minimize data movements from the data storage devices to the host computer.

SUMMARY

According to one embodiment, a bridge device includes: a first interface configured to receive a first set of commands from an application running on a host computer; one or more command processors, each of the one or more command processors being configured to translate the first set of commands and generate a second set of commands based on the first set of commands; a second interface configured to provide the second set of commands to a data storage device; and a computing processor configured to issue an internal command to fetch data from the data storage device and write data to the data storage device in a background mode in an agnostic manner to the host computer while running the application.

According to another embodiment, a method includes: receiving a first set of commands from an application running on a host computer via a first interface; translating the first set of commands and generating a second set of commands based on the first set of commands; providing the second set of commands to a data storage device via a second interface; and issuing an internal command to fetch data from the data storage device and write data to the data storage device in a background mode in an agnostic manner to the host computer while running the application.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
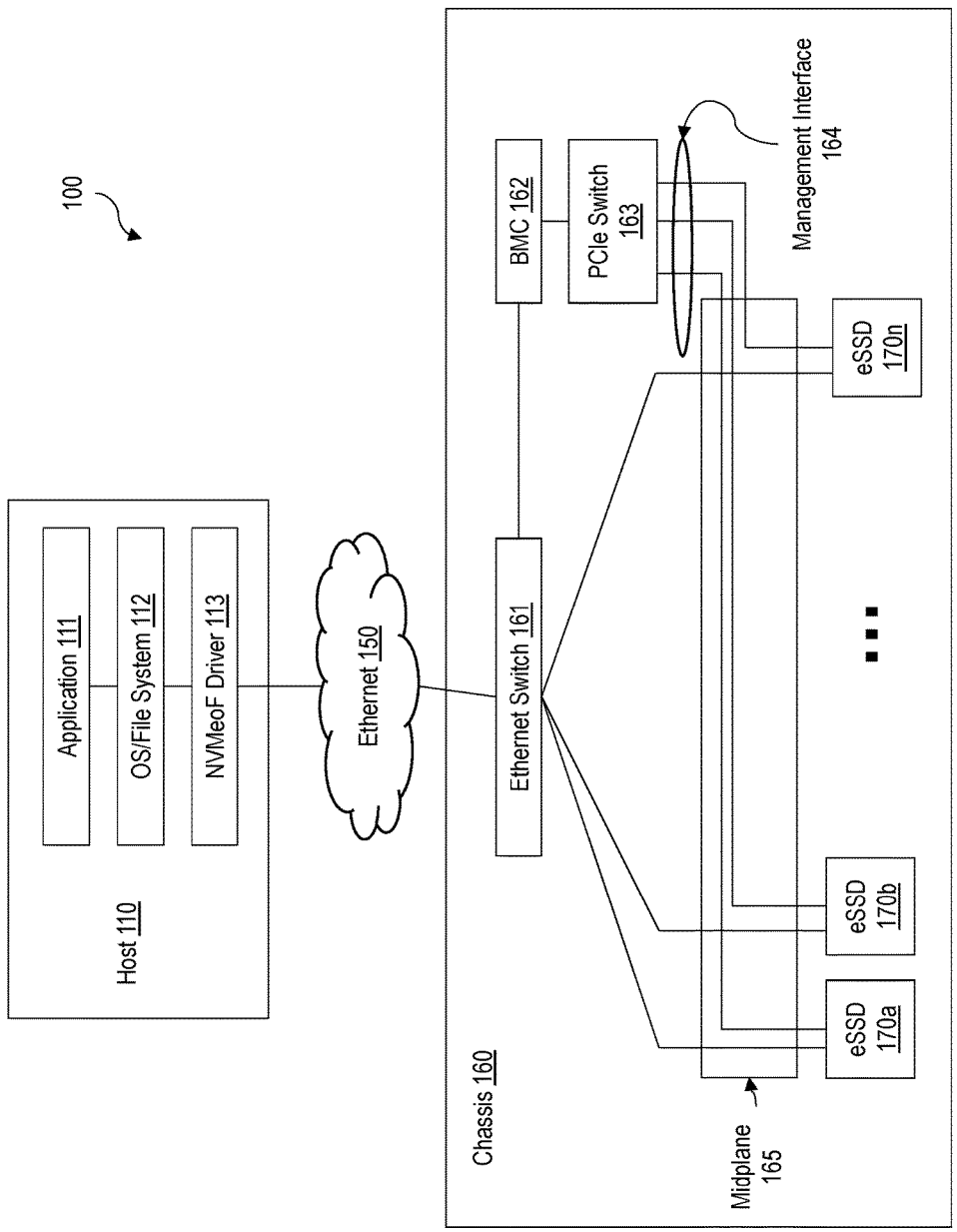
FIG. 1 shows a block diagram of an example data storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a bridge device for providing near storage compute. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system and method for offloading data processing and mining tasks from a host computer to a storage device to minimize data movements from the storage device to the host computer in a disaggregated data storage system. According to one embodiment, the present system and method allows processing data near a storage device or in a storage device, herein respectively referred to as near-storage compute (NSC) and in-storage acceleration (ISA). The present system and method is well suited for disaggregated storage devices using the NVMe-oF standard. In addition, the present system and method can be used in a direct attached NVMe-to-NVMe bridge device. A host computer can offload some of its data mining tasks to the NVMe-oF SSDs to reduce data movement between the host computer and the NVMe-oF SSDs through the NVMe-oF network to save energy and network infrastructure costs.

FIG. 1 shows a block diagram of an example data storage system, according to one embodiment. The data storage system 100 includes a host 110 and a chassis 160 (herein also referred to as an eSSD chassis) containing one or more NVMe-oF-compatible Ethernet SSDs (eSSDs). For example, the chassis 160 includes 24 or 48 eSSDs. The eSSDs in the chassis 160 are respectively denoted as eSSDs 170a-170n (herein collectively referred to as eSSDs 170). The host 110 includes an application 111, an operating system (OS) and a file system (FS) 112, and an NVMe-oF driver 113. An initiator (e.g., the application 111) of the host 110 can establish an NVMe-oF connection with the eSSDs 170 over the Ethernet 150 using the NVMe-oF driver 113. The chassis 160 includes an Ethernet switch 161, a baseboard management controller (BMC) 162, and a peripheral component interconnect express (PCIe) switch 163. The Ethernet switch 161 provides an Ethernet connection to the eSSDs 170 over the midplane 165, and the PCIe switch 163 provides a management interface 164 to the eSSDs 170 over the midplane 165. The BMC 162 can program the eSSDs 170 according to an instruction given by a system administrator.

The Ethernet switch 161 provides network connectivity between the host 110 and the eSSDs 170. The Ethernet switch 161 may have large-capacity (e.g., 100 Gbps) uplinks to connect to one or more hosts. The Ethernet switch 161 also has multiple lower-capacity (e.g., 25 Gbps) downlinks to connect to the eSSDs 170. For example, the Ethernet switch 161 contains 12 uplinks of 100 Gbps and 24 or 48 downlinks of 25 Gbps. The Ethernet switch 161 may have a special configuration/management port to the BMC 162.

The BMC 162 manages the internal components of the chassis 160 including the Ethernet switch 161, the PCIe switch 163, and the eSSDs 170. The BMC 162 can support PCIe and/or system management bus (SMBus) interfaces for the system management. The BMC 162 can configure the eSSDs 170 and program the Ethernet switch 161.

Similar to server based all-flash arrays (AFAs), eSSDs 170 are housed together in a server-less enclosure (i.e., the chassis 160) that contains a bunch of eSSDs, a network switch (i.e., the Ethernet switch 161) to connect them with the outside world's hosts and the BMC 162 to manage them. The BMC 162 handles the boot and control paths to the eSSD devices. Unlike a full-fledged x86 CPU, the BMC 162 may not do all those tasks that a CPU can handle and hence does the minimal enclosure management functions. The BMC 162 does keep a health check on the connected eSSDs 170 and related hardware for connectivity, status, temperature, logs, and errors through the SMBus or PCIe bus.

The eSSDs 170 offer a high-performance and large capacity data storage solution. The NVMe-oF protocol enables hundreds and thousands of disaggregated eSSDs 170 to be attached to the application 111 running on the host computer 110 in a remote direct attach (rDAS) manner. The present system and method facilitate the processing and movement of the large amount of data collected and stored in the disaggregated eSSDs. Such data processing using conventional host computers can be very expensive.

The application 111 running on the host computer 100 can perform processes such as machine learning by fetching data stored in the disaggregated data storage devices such as eSSDs 170 across the network (e.g., Ethernet 150), process the data, and store the results of the data processing back to the data storage devices. Such a process including data fetching, processing, and storage can be highly inefficient, consuming excessive energy, computing, network, and data storage resources on the host computer. In addition, the process may impose costly requirements on the compute and memory resources on the host computer.

The present system and method enables background data processing using near-storage compute or in-storage acceleration. Near-storage compute and in-storage acceleration allow a large amount of data to be processed in the background in an efficient manner. According to one embodiment, a bridge device that is coupled to a data storage device in which data to be processed is stored can facilitate background data processing near the coupled data storage device. In one embodiment, the bridge device is integrated in the data storage device. In other embodiments, the bridge device is a separate device connected to the data storage device. It is understood that the term "near" indicates that the data processing can occur not only in a separate device but also within the data storage device itself without deviating from the scope of the present disclosure. In some embodiments, the terms "near-storage" and "in-storage" can be interchangeably used herein.

The bridge device can have one or more hardware components that can implement near-storage computing of the data stored in the data storage devices in a manner that is transparent to the application. The bridge device may be one of an NVMe-oF-to-NVMe and an NVMe-to-NVMe bridge device. The NVMe-oF-to-NVMe bridge device that is compatible with the NVMe-oF standard can receive NVMe-oF commands over the fabric network and provide a PCIe interface to a backend data storage device. The NVMe-to-NVMe bridge device that is compatible with the NVMe standard can receive NVMe commands over a PCI bus and perform data processing near the data storage device. Hereinafter, for the sake of convenience, eSSDs are described as an example of the data storage devices; however, it is understood that other types of data storage devices and distributed data storage systems can be used without deviating from the scope of the present disclosure. In the following examples, an eSSD is described as a device including both a bridge device and a backend SSD; however, it is understood that a data storage device (backend SSD) may be connected to a discrete bridge device to form an eSSD, or an eSSD may refer to a bridge device itself or a device capable of performing the near-computing functions of the bridge device in other embodiments.

The present bridge device can fetch, process, and modify data stored on the backend SSDs and store the processed data back to the backend SSDs without impacting normal data access operations of a host computer to the SSDs. In one embodiment, the bridge device can have a system memory to maintain a pair of input/output (I/O) submission and completion queues and perform data access to the backend SSDs in a background mode using the I/O queue pair. The bridge device can share the I/O submission and completion queues to process both commands originated from the host computer and internal commands originated from a near-storage processor of the bridge device. In addition, the system memory of the bridge device can maintain a pair of admin queues including admin submission and completion queues that can be shared between the host computer and the NSC processor.

According to one embodiment, the bridge device can employ NVMe-oF-to-NVMe or NVMe-to-NVMe protocol bridging allowing the NSC processor to access the data stored on the backend SSDs. Various processes such as machine learning (ML) algorithms can run on the host computer or the bridge device to perform data processing in the background in a manner that is agnostic to the host computer. The host computer running the ML algorithm can reside outside of the bridge device but still can get an access to the data stored in the eSSDs indirectly through the bridge device. In some embodiments, the bridge device and/or the host computer can reside in the same chassis as the eSSD(s) but in a different slot (e.g., U.2 slot), or they may reside physically external to the chassis. Although the following examples explained in conjunction with the drawings mainly describe an NVMe-oF bridge device (also referred to as NVMe-oF-to-NVMe bridge device), they are equally applicable to an NVMe-to-NVMe bridge device.

The bridge device provides an interface to receive a host command (e.g., an NVMe-oF command) that is destined for a backend SSD. The bridge device maps a received host command identifier (CID) to a local tag, generates an NVMe command including a new CID to the backend SSD that stores data to be processed. The backend SSD generates a completion entry (CE) corresponding to the NVMe command and sends it to the bridge device. Then, the bridge device parses the CE and intelligently forwards the CE to the NSC processor of the bridge device.

Independently from bridging host-initiated commands, the NSC processor of the bridge device can issue NVMe commands to the backend SSD in a manner agnostic to the host computer. Using the shared I/O and admin queues, the bridge device can actively process I/O operations from both the host computer and the NSC processor at the same time without causing an interference to each other. The NSC processor's capability to access data stored in the backend SSD while maintaining its capability of bridging host commands makes it adequate for a machine learning application to run in a near-storage computing device (i.e., bridge device). The NSC processor provides an energy, resource, and cost-efficient processing of data for the machine learning application.

The NVMe-oF bridge device can provide an NVMe-oF interface to a remote initiator (e.g., a machine learning application running on the host computer) on one side and the standard PCIe-based NVMe interface to the backend SSD on the other side. The remote initiator connects to the NVMe-oF bridge device over Ethernet via the NVMe-oF interface. The NVMe-oF bridge device can translate the NVMe-oF protocol to an NVMe protocol for connecting to the backend SSD.

On the other hand, the NVMe bridge device can provide the standard PCIe interface to a remote initiator and the backend SSD. The remote initiator connects to the NVMe bridge device over the PCIe bus. The NVMe bridge device can translate the NVMe host command to another NVMe command with a different command identifier such that the backend SSD sees the NVMe command as if it is originated from the NVMe bridge device as opposed to the host computer.

According to one embodiment, the NVMe-oF-to-NVMe or the NVMe-to-NVMe bridge functionality of the bridge device can be implemented in a field-programmable gate array (FPGA) or an application-specific integrated chip (ASIC). Alternatively, the bridge functionality can be implemented in a firmware or a software program.

Figure 2:
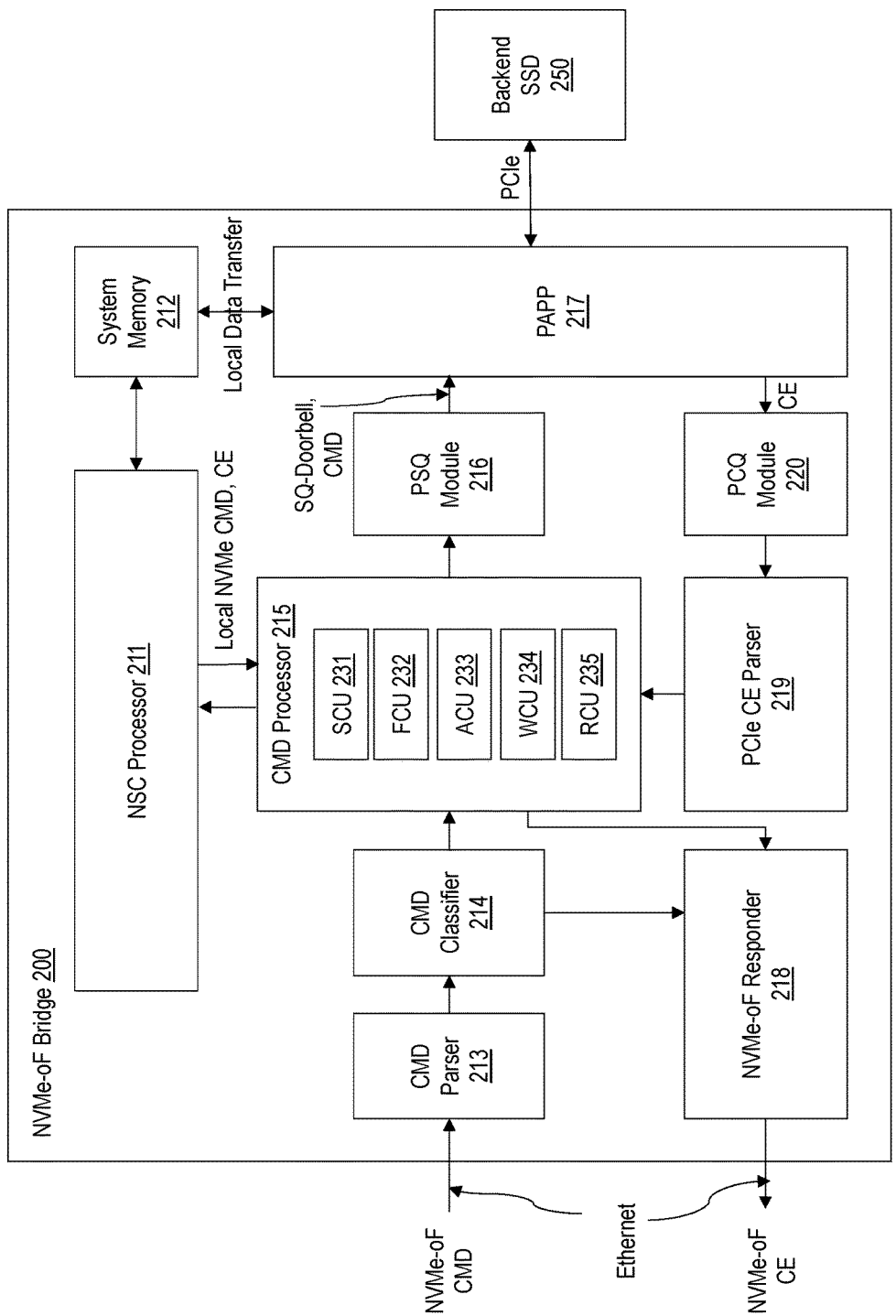
FIG. 2 shows a block diagram of an example NVMe-oF bridge device, according to one embodiment.

FIG. 2 shows a block diagram of an example NVMe-oF bridge device, according to one embodiment. The NVMe-oF bridge device 200 includes a near-storage compute (NSC) processor 211, a system memory 212, a command parser 213, a command classifier 214, and a command processor 215, a PCIe-side command submission queue (PSQ) module 216, a PCIe application (PAPP)/root complex module 217, an NVMe-oF responder 218, a PCIe CE parser 219, and a PCIe-side command completion queue (PCQ) module 220. The NVMe-oF bridge device 200 is coupled to a backend SSD 250 via the PCIe bus. A remote initiator running on a host computer sends NVMe-oF commands to the backend SSD 250 over the fabric network, in the present example, Ethernet.

The command parser 213 of the NVMe-oF bridge device 200 intercepts NVMe-oF commands destined for the backend SSD 250, parses them, and sends the parsed NVMe-oF commands to the command classifier 214. For example, the command parser 213 extracts and parses various commands including, but not limited to, a command opcode (OPC), a command identifier (CID), a namespace identifier (NSID), a number of logical blocks (NLB), and a start logical block address (SLBA). The command classifier 214 classifies the parsed NVMe-oF commands into different groups and sends the classified NVMe-oF commands to the command processor 215. For example, the command classifier 214 classifies admin commands, fabric commands, read commands, write commands, and special commands. Different commands or groups of NVMe-oF commands can be processed using specialized command processing units of the command processor 215. For example, the command processor 215 includes a special command unit (SCU) 231, a fabrics command unit (FCU) 232, an admin command unit (ACU) 233, a read command unit (RCU) 234, and a write command unit (WCU) 235.

These command processing units 231-235 translate the NVMe-oF commands into NVMe commands and place them into the PSQ module 216. According to one embodiment, the PSQ module 216 implements command submission queues and maintains head and tail pointers for the active submission queues. The PSQ module 216 can detect the active submission queues and generate conditional flags indicating that the submission queue is full or empty. When NVMe commands are placed into the submission queues, the PSQ module 216 can generate and send doorbell events (submission queue-doorbell) to the backend SSD 250 via the PAPP module 217. The PAPP module 217 implements a PCIe transport to the backend SSD 250 to send the door-bell events over the PCIe bus. The PAPP module 217 supports standard PCIe transaction commands including config read, config write, memory write, and memory read that are needed by the NVMe-oF bridge device 200. In addition, the PAPP module 217 supports PCIe memory read and memory write transactions needed by a PCIe end-point of a NVMe bridge device 200. In other words, the PAPP module 217 implements and supports a PCIe root complex function of the NVMe-oF bridge device 200 rendering the NVMe-oF bridge device 200 a PCIe root complex device.

The PCQ module 220 implements command completion queues for the backend SSD 250. The backend SSD 250 can write a command completion entry (CE) for each NVMe command it processes. Normally, there is one-to-one mapping between the command submission queue and the command completion queue. The PCIe CE parser 219 parses the completion entries (CEs) received from the PCQ module 220 and interprets them. The PCIe CE parser 219 forwards the parsed CEs to the appropriate command processing units 231-235 that generated the corresponding NVMe commands. The appropriate command units 231-235 generate NVMe-oF CEs corresponding to the PCIe CEs (or NVMe CEs) that are received from the PCIe CE parser 219 and forward them to the NVMe-oF responder 218 for issuing the NVMe-oF CEs back to the remote initiator over the NVMe-oF interface (e.g., Ethernet). The NVMe-oF CEs may be preceded by transfers of read data or write data to the remote initiator. As a part of the NVMe-oF command bridging, the command units 231-235 facilitate data transfer between the backend SSD 250 and the remote initiator.

In response to the door-bell events, the backend SSD 250 fetches the NVMe commands received from the PSQ module 216 and executes them. As a part of the command execution, the backend SSD 250 may perform data transfers. Such data transfers can be done to/from the system memory 212 or on-chip or off-chip memory available in the NVMe-oF bridge device 200.

Figure 3:
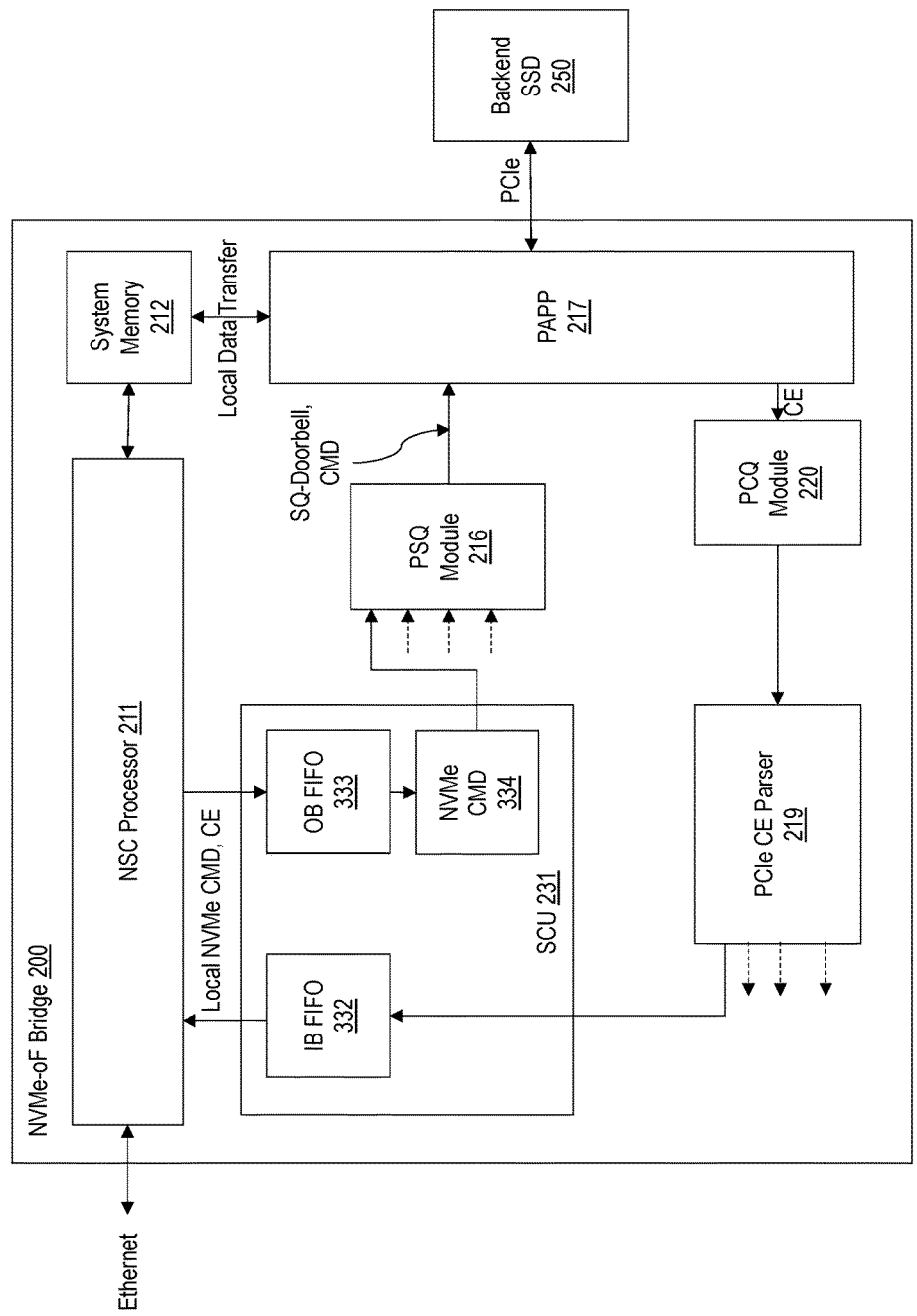
FIG. 3 shows a block diagram of an example SCU module, according to one embodiment.

FIG. 3 shows a block diagram of an example SCU module, according to one embodiment. The SCU 231 implements an interface to the NSC processor 211 for issuing special commands to the backend SSD 250. The NSC processor 211 can fetch data from the backend SSD 250 or write data or results to the backend SSD 250 in the background using this interface.

The FCU 232 is a fabrics command unit that handles the fabrics type of commands for NVMe-oF protocol. Examples of the fabrics commands include, but are not limited to, Connect, Property Get, Property Set, etc. The ACU 233 is an admin commands unit. Examples of the admin commands include, but are not limited to, Identify, Get Log Page, etc. The WCU 234 is a write commands unit that handles Write commands. The RCU 235 is a read commands unit that handles Read commands.

Referring to FIG. 3, the SCU 231 includes an inbound (IB) first input first output (FIFO) 332, an outbound (OB) FIFO 333, and a buffer for NVMe commands 334. The IBFIFO 332 and OBFIFO 333 are the structures used by the NSC processor 211 for issuing special commands to the backend SSD 250. The NSC processor 211 creates an NVMe command, places it in a message, and writes the message to the OBFIFO 333. The SCU 231 reads the message and sends the NVMe command to the backend SSD 250. When the backend SSD 250 responds with Completion Entry, the SCU 231 places the CE in a message and write the message into the IBFIFO 332. The NSC processor 211 reads the CE from IBFIFO 332 for further processing.

Figure 4:
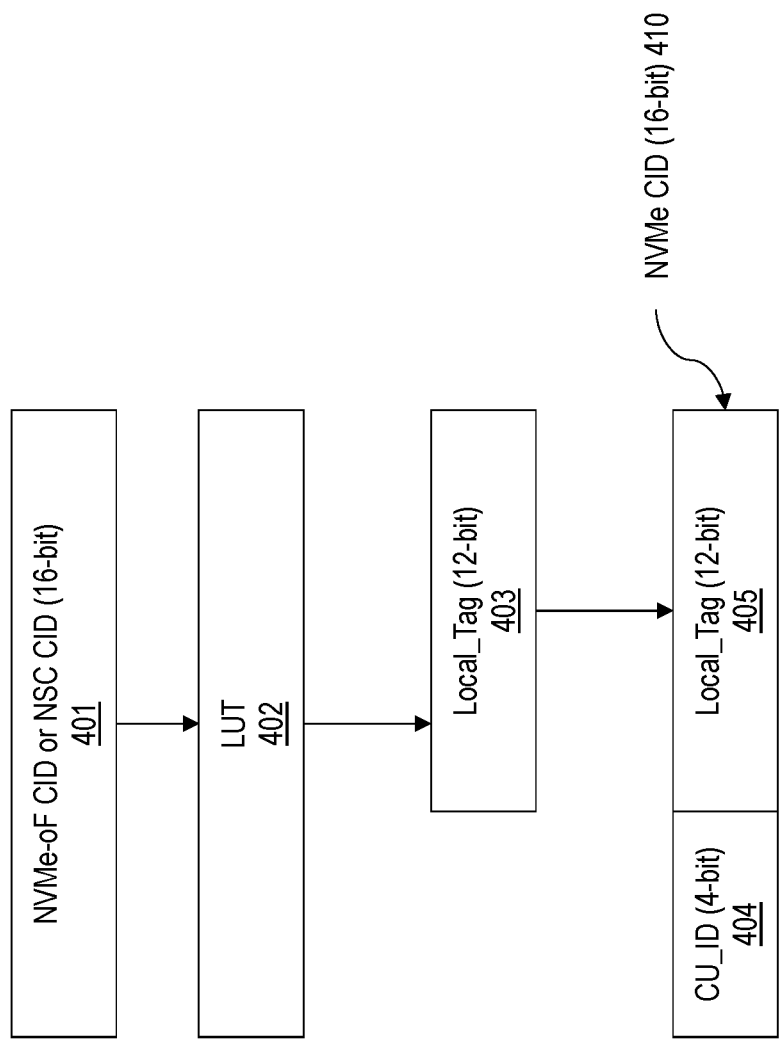
FIG. 4 shows an example process of translating command identifiers, according to one embodiment.

FIG. 4 shows an example process of translating command identifiers (CIDs), according to one embodiment. A bridge device receives an incoming command (either an NVMe-oF or an NVMe command) that contains a 16-bit command identifier (CID) (401). The 16-bit CID and a submission queue (SQ) number can uniquely identify an active command. The CE for the given command contains the same 16-bit CID so that the CE can be correctly associated with the corresponding NVMe command by a reverse look-up, which will be discussed in detail below.

In the case of an NVMe-oF bridge device, the NVMe-oF bridge device receives a NVMe-oF command and creates a context for the NVMe-oF command and records a local command tag (herein also referred to as a local tag). In one embodiment, the NVMe-oF bridge device looks up a lookup table (LUT) (402) and maps the received 16-bit CID to a 12-bit local tag (403). If the lookup table is full, the incoming commands may be paused from execution limiting the number of active commands to the capacity of the lookup table (2^12). The 12-bit local tag is further used as a part of a 16-bit NVMe CID 410 for the outgoing NVMe command to the backend SSD. The translated NVMe command contains the newly constructed 16-bit NVMe CID 410. According to one embodiment, the NVMe CID 410 includes two fields: a 4-bit command processing unit ID (CU_ID) (404) and a 12-bit local tag (405). The split fields of 12-bit local tag and 4-bit CU_ID are only an example, and it is understood that these two fields can have different sizes in other implementations without deviating from the scope of the present disclosure. In the present example, the NVMe CID 410 can be constructed using the following mapping scheme:

NVMe CID[15:0]={CU_ID[3:0], Local_Tag[11:0] };

The command unit ID (CU_ID) can be determined depending on a command unit of the bridge device that processes the incoming NVMe-oF command. Table 1 shows an example encoding scheme for the command processing unit ID (CU_ID).

TABLE 1

| Command Unit | CU_ID |
|---|---|
| FCU | 0 |
| ACU | 1 |
| WCU | 2 |
| RCU | 3 |
| SCU | 4 |

The 12-bit local tag of the NVMe CID is used to map to the NVMe-oF CID received in the original NVMe-oF command. The 12-bit local tag for command processing units other than SCU 231 can be obtained as follows:

Local_Tag[11:0]=LUT (NVMe-oF CID[15:0]),

The lookup table LUT maps the 16-bit NVMe-oF CID to the 12-bit local tag. The lookup table LUT is a dynamic entity that is maintained by the command classifier 214. When a host command is received, an entry in the lookup table LUT is allocated. The 12-bit index of the entry is a 12-bit Local Tag. The original 16-bit CID is stored at the corresponding index. When the command is completed, the entry in the lookup table LUT is de-allocated.

The 12-bit local tag for the SCU 231 can be obtained as follows:

Local_Tag[11:0]=LUT (NSC CID[15:0]), where the NSC CID is a command ID that the NSC processor assigns internally. The NSC-CID refers to the 16-bit CID value contained in the commands issued by the NSC processor. The above equations for determining the Local Tag are used to map the CID from the commands received from the host or the NSC processor to a 12-bit Local Tag.

After the 12-bit local tag is looked up, the remaining 4-bit CU_ID of the NVMe CID helps to perform a reverse look-up of an NVMe completion entry (CE) received from the backend SSD 250. The NVMe CE is used to associate the NVMe CID with the processing unit that generated the corresponding NVMe command among the processing units of the bridge device. Referring to FIG. 2, the PCIe CE parser 219 extracts the 4-bit CU_ID from the NVMe CID received from the backend SSD 250 via the PAPP 217 and determines which processing unit the CE belongs to. Once the received NVMe CE is delivered to the appropriate command unit, the PCIe CE parser 219 performs another reverse look-up to map the 12-bit local tag to the original NVMe-oF CID. In the case of the SCU 231, this reverse look-up would use the NSC-CID instead of the NVMe-oF CID as described above.

Utilizing this NVMe-oF to NVMe mapping (or NVMe to NVMe mapping), the NVMe-of bridge 200 can support multiple command processing units to issue NVMe commands to the backend SSD 250. For example, the NVMe-oF bridge 200 can support up to 4096 ($2^{12}$) active NVMe commands (i.e., queue-depth) for a given submission queue SQ (12-bit depth of the local tag). The SCU 231 uses this mechanism to issue various NVMe commands by the NSC processor to the backend SSD 250 without interfering with host commands. For example, the NSC processor fetches chunks of data from the backend SSD by issuing NVMe Read commands, process the fetched data, and store the results back to the backend SSD by issuing NVMe Write commands. It is noted that different sizes of CU_ID and local tag components of the NVMe-CID can be used, and such NVMe-CID arrangement can provide a different maximum queue-depth.

Figure 5:
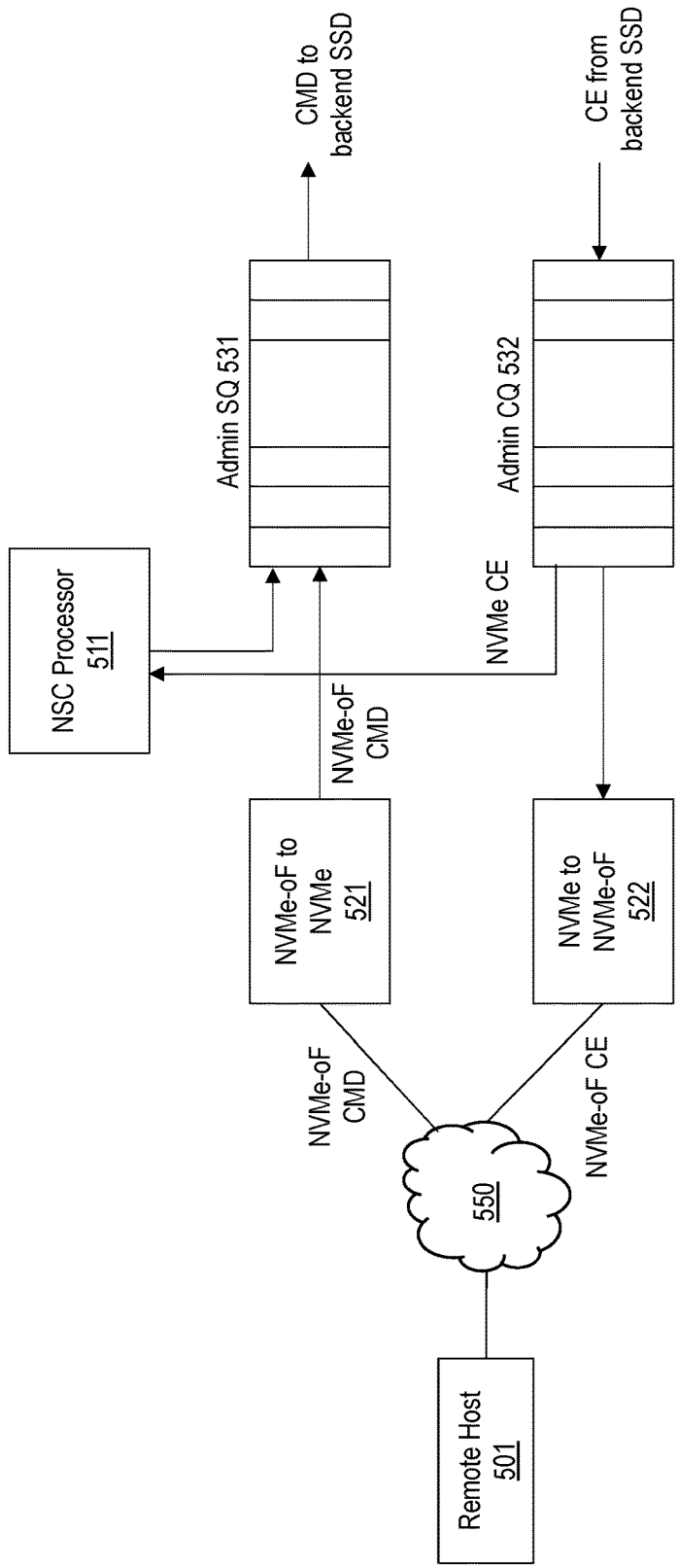
FIG. 5 is a block diagram illustrating sharing of admin submission and completion queues, according to one embodiment.

FIG. 5 is a block diagram illustrating sharing of admin submission and completion queues, according to one embodiment. The backend SSD can share an admin queue pair including an admin SQ 531 and an admin CQ 532 with the present bridge device. The admin SQ 531 is used to issue admin commands to the backend SSD. An application running on a remote host 501 may be a data-centric application (e.g., a machine learning application) that requires access to the data storage in the backend SSD. The NVMe-oF-to-NVMe command translator 521 (e.g., the FCU 232 and the ACU 233 of FIG. 2) of the NVMe-oF bridge device translates the NVMe-oF admin commands received from the remote initiator to NVMe admin commands and places the NVMe admin commands into the admin SQ 531 (e.g., PSQ module 216 of FIG. 2). The NSC processor 531 of the NVMe-oF bridge device can also issue admin commands to the backend SSD via the admin SQ 531.

Each of the NVMe-oF command processing units such as FCU, ACU, WCU, and RCU can have a unique 4-bit CU_ID. Hence, it is possible to issue admin commands from both the NVMe-oF host as well as the NSC processor 511 through the same admin SQ 531. It is assumed that the NSC processor 511 only issues admin commands that would not affect data integrity of the host-visible user data or control data structures of the backend SSD. The NSC processor 511 may only read or monitor host data and modify only the data owned by itself. In some embodiments, the remote host 501 and the NSC processor 511 may share the data stored in the backend SSD through data synchronization.

Figure 6:
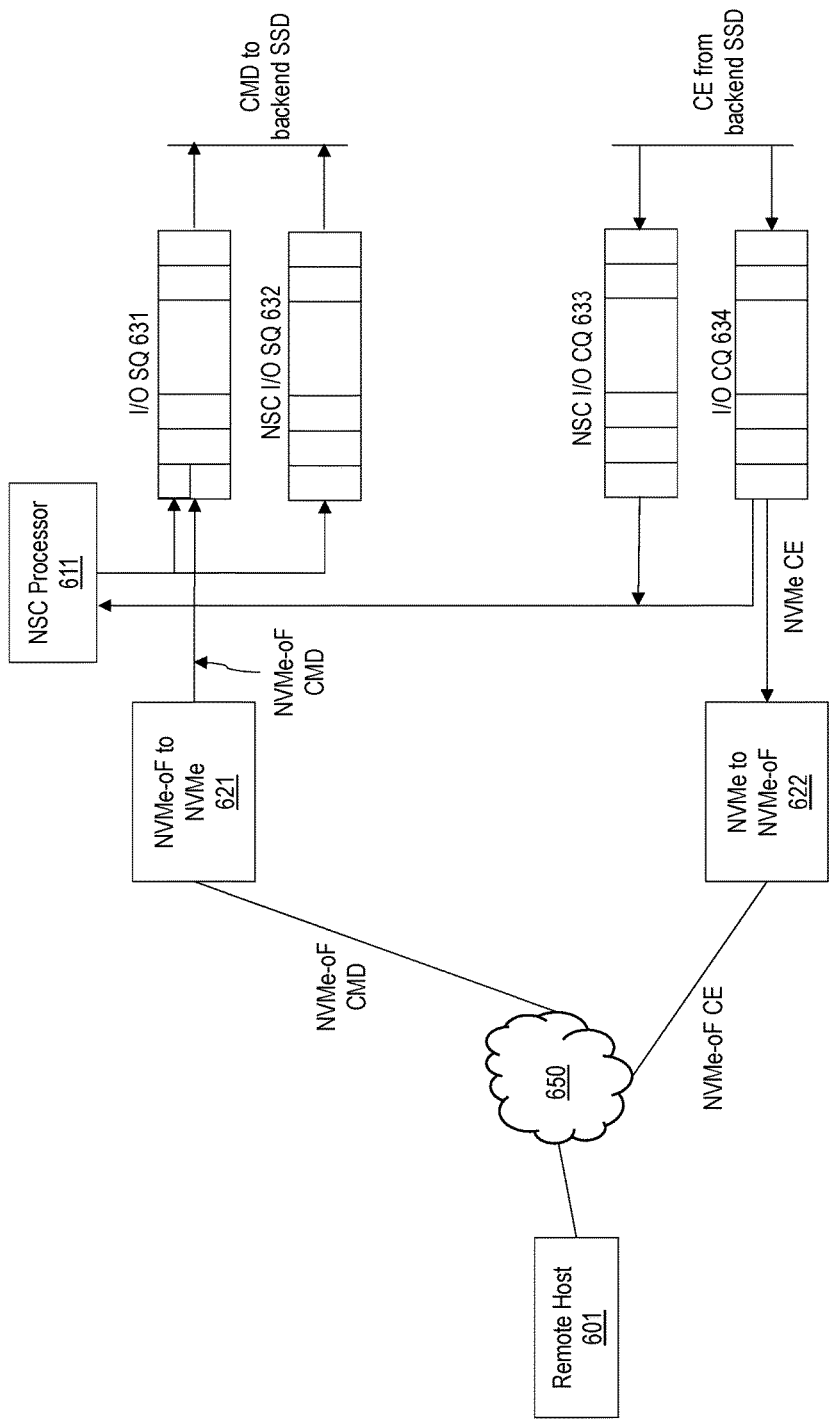
FIG. 6 shows a sharing of IO SQs between remote host and the NSC processor, according to one embodiment.

FIG. 6 shows a sharing of IO SQs between remote host and the NSC processor, according to one embodiment. Unlike the admin SQ 531 of FIG. 5, there may be a large number of I/O SQs. The I/O SQs can be used to issue data commands such as read and write. The I/O commands move data to/from the remote initiator and the backend SSD and vice versa. Using different CU_ID values, the SCU can place I/O commands for the NSC processor into the same I/O SQs that are being used for host I/O commands. In another embodiment, a dedicated set of I/O SQs for the NSC processor can be used to process the I/O commands that originate from the NSC processor 611. FIG. 6 shows an example in which two separate I/O command submission and completion queues are used for the NSC processor 611 and the I/O commands that originate from the remote initiator.

In either case, the PCE parser uses the CU_ID to appropriately route the CEs received from the backend SSD to the appropriate command units of the bridge device. It is assumed that the NSC processor 611 issues I/O commands that do not lead to modification of the host data. Primarily, the NSC processor 611 would read the data written by the host 601 to process and analyze the read data for local processing. The modified data or the analysis results that are generated by the NSC processor 611 may be written to a separate storage area that may or may not be accessible to the host 601. In one embodiment, the NSC processor 611 and the remote initiator running on the host 610 can have a high-level synchronization to share the same data and storage namespaces.

Figure 7:
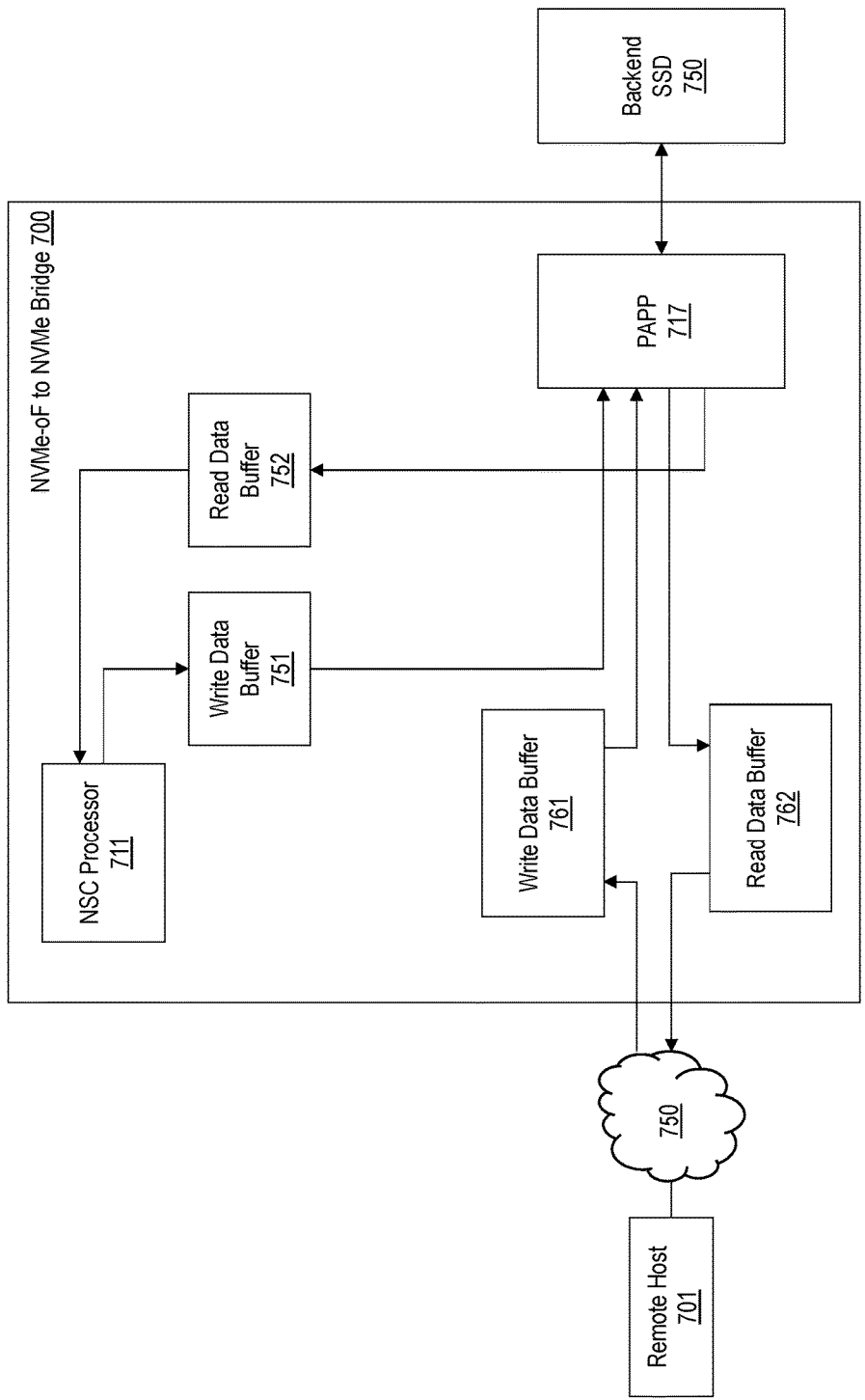
FIG. 7 is a diagram illustrating local data movement within a bridge device, according to one embodiment.

FIG. 7 is a diagram illustrating local data movement within a bridge device, according to one embodiment. The bridge device 700 includes a write data buffer 751 and a read data buffer 752. According to one embodiment, a system memory (e.g., the system memory 212 of FIG. 3) of the bridge device 700 includes the write data buffer 751 and the read data buffer 752.

The NSC processor 711 scans and analyzes the SSD data in the background. The NSC processor 711 can periodically fetch the user data from the backend SSD 750 and analyzes it. The NSC processor 711 can store the modified data and/or the results of the data processing back to the backend SSD 750. These operations need data movement to and from the backend SSD 750. The NSC NVMe commands specify the details of such data transfers.

In one embodiment, the NSC processor 711 uses NSC NVMe command opcodes to indicate whether the NVMe command is a write command or a read command. The NSC NVMe command may also indicate an associated logical block address (LBA) of the write data buffer 751 or the read data buffer 752. For an NSC write command, data is moved from the system memory of the bridge device 700 to the backend SSD 750. For an NSC read command, the data is moved from the backend SSD 750 to the system memory of the bridge device 700. For the data transfers of host commands, a separate set of buffer addresses in the write data buffer 751 or the read data buffer 752 may be used not to mix these two data movements.

When the NSC processor 711 issues an NSC NVMe command to process data stored in the backend SSD 750. The NSC process 711 first allocates a space in the read data buffer 752 having a desired size. The NCS processor 711 then uses the pointer of the allocated read buffer space to create a NVMe read command. The NSC processor 711 populates appropriate Namespace.LBA address in the backend SSD 750 to read the data stored in the backend SSD 750. The NSC processor 711 then places the constructed NSC-NVMe-read command into appropriate I/O SQ of the bridge device 700. The backend SSD 750 fetches the NSC-NVMe-read command via the PCIe bus and performs DMA write operation of the requested data to the system memory using the pointer of the allocated read buffer space in the read data buffer 752. The backend SSD 750 then sends the NSC-NVMe-read command completion entry to the bridge device 700. The bridge device 700 can intelligently forward the NSC-NVMe-read completion to the NSC processor 711. At this point, the NSC processor 711 proceeds to process or analyze the fetched data.

The NSC processor 711 may modify the fetched data. The NSC processor 711 may also generate new data as a result of the data processing. At some point, the NSC processor 711 may persist such data by performing a write operation to the backend SSD 750. The NSC processor 711 constructs an NSC-NVMe-write command using the address of the data that needs to be written to the backend SSD 750. The NSC processor 711 then inserts appropriate Namespace.LBA storage location where the data would be written inside the backend SSD 750. 750. The NSC processor 711 then places the newly constructed NSC NVMe write command to the I/O SQ of the bridge device 700. The backend SSD 750 fetches the NSC NVMe write command via the PCIe bus and executes it. The backend SSD 750 performs a DMA operation to write the data from the system memory to the backend SSD address specified in the NSC NVMe write command. Once the data DMA operation is completed, the backend SSD 750 sends the completion entry for the NSC-NVMe-write command. The bridge device 700 can intelligently forward the NSC-NVMe-write command completion entry to the NSC processor 711. At that point, the NSC processor may discard the write data in the write data buffer 751.

According to one embodiment, a bridge device includes: a first interface configured to receive a first set of commands from an application running on a host computer; one or more command processors, each of the one or more command processors being configured to translate the first set of commands and generate a second set of commands based on the first set of commands; a second interface configured to provide the second set of commands to a data storage device; and a computing processor configured to issue an internal command to fetch data from the data storage device and write data to the data storage device in a background mode in an agnostic manner to the host computer while running the application.

The data storage device may be a solid-state drive compatible with the nonvolatile memory express (NVMe) standard.

The data storage device may be a solid-state drive compatible with the NVMe over fabrics (NVMe-oF) standard.

The first interface may be an NVMe-oF interface over a fabric network, and the second interface to the data storage device may be a PCIe interface. The first set of commands may include NVMe-oF commands, and the second set of commands may include NVMe commands.

The fabric network may be selected from Ethernet, Fibre Channel, and Infiniband.

The bridge device may further include a command parser and a command classifier. The command parser may be configured to parse the first set of commands and generate parsed commands, and the command classifier may be configured to classify the parsed commands and provide classified commands to the one or more command processors.

The one or more command processors may include a special command unit configured to process a subset of commands of the second set of commands that is issued by the computing processor.

The application may be a machine learning (ML) application.

Each of the second set of commands may include a command identifier including a command unit identifier corresponding to the one or more command processors and a local tag that is mapped to the first set of commands by a lookup table.

The bridge device may further include a submission queue for queuing the second set of commands to the data storage device and a completion queue for queuing completion entries received from the data storage device.

According to another embodiment, a method includes: receiving a first set of commands from an application running on a host computer via a first interface; translating the first set of commands and generating a second set of commands based on the first set of commands; providing the second set of commands to a data storage device via a second interface; and issuing an internal command to fetch data from the data storage device and write data to the data storage device in a background mode in an agnostic manner to the host computer while running the application.

The data storage device may be a solid-state drive compatible with the nonvolatile memory express (NVMe) standard.

The data storage device may be a solid-state drive compatible with the NVMe over fabrics (NVMe-oF) standard The first interface may be an NVMe-oF interface over a fabric network, and the second interface to the data storage device may be a PCIe interface. The first set of commands may include NVMe-oF commands, and the second set of commands may include NVMe commands.

The fabric network may be selected from Ethernet, Fibre Channel, and Infiniband

The method may further include: parsing the first set of commands and generating parsed commands, and classifying the parsed commands and providing classified commands to the one or more command processors.

The one or more command processors may include a special command unit configured to process a subset of commands of the second set of commands that is issued by the computing processor.

The application may be a machine learning (ML) application.

Each of the second set of commands may include a command identifier including a command unit identifier corresponding to the one or more command processors and a local tag that is mapped to the first set of commands by a lookup table.

The method may further include providing a submission queue for queuing the second set of commands to the data storage device and a completion queue for queuing completion entries received from the data storage device.

The above example embodiments have been described hereinabove to illustrate various embodiments of implementing a bridge device for providing near storage compute. Various modifications and departures from the disclosed example embodiments will occur to those having ordinary skill in the art. The subject matter that is intended to be within the scope of the invention is set forth in the following claims.

What is claimed is:

1. A bridge device comprising:
   a first interface configured to receive a first set of commands from an application running on a host computer;
   one or more command processors, each of the one or more command processors being configured to translate the first set of commands and generate a second set of commands based on the first set of commands;
   a second interface configured to provide the second set of commands to a data storage device; and
   a computing processor configured to issue an internal command that is generated by the bridge device independently from the first set of commands to fetch data from the data storage device and write data to the data storage device in a background mode during processing at least one command of the first set of commands received from the application.

2. The bridge device of claim 1, wherein the data storage device is a solid-state drive compatible with the nonvolatile memory express (NVMe) standard.

3. The bridge device of claim 1, wherein the data storage device is a solid-state drive compatible with the NVMe over fabrics (NVMe-oF) standard.

4. The bridge device of claim 3, wherein the first interface is an NVMe-oF interface over a fabric network, and the second interface to the data storage device is a PCIe interface, and wherein the first set of commands includes NVMe-oF commands, the second set of commands includes NVMe commands, and the internal command includes a command identifier that is assigned by the computing processor.

5. The bridge device of claim 4, wherein the fabric network is selected from Ethernet, Fibre Channel, and Infiniband.

6. The bridge device of claim 1, further comprising a command parser and a command classifier, wherein the command parser is configured to parse the first set of commands and generate parsed commands, and the command classifier is configured to classify the parsed commands and provide classified commands to the one or more command processors.

7. The bridge device of claim 1, wherein the one or more command processors includes a special command unit configured to process a subset of commands of the second set of commands that is issued by the computing processor.

8. The bridge device of claim 1, wherein the application is a machine learning (ML) application.

9. The bridge device of claim 1, wherein each of the second set of commands includes a command identifier including a command unit identifier corresponding to the one or more command processors and a local tag that is mapped to the first set of commands by a lookup table.

10. The bridge device of claim 1, further includes a submission queue for queuing the second set of commands to the data storage device and a completion queue for queuing completion entries received from the data storage device.

11. A method comprising:
    receiving a first set of commands from an application running on a host computer via a first interface;
    translating the first set of commands and generating a second set of commands based on the first set of commands;
    providing the second set of commands to a data storage device via a second interface; and
    issuing an internal command that is generated by the bridge device independently from the first set of commands to fetch data from the data storage device and write data to the data storage device in a background mode during processing at least one command of the first set of commands received from the application.

12. The method of claim 11, wherein the data storage device is a solid-state drive compatible with the nonvolatile memory express (NVMe) standard.

13. The method of claim 11, wherein the data storage device is a solid-state drive compatible with the NVMe over fabrics (NVMe-oF) standard.

14. The method of claim 13, wherein the first interface is an NVMe-oF interface over a fabric network, and the second interface to the data storage device is a PCIe interface, and wherein the first set of commands includes NVMe-oF commands, the second set of commands includes NVMe commands, and the internal command includes a command identifier that is assigned by the computing processor.

15. The method of claim 14, wherein the fabric network is selected from Ethernet, Fibre Channel, and Infiniband.

16. The method of claim 11, further comprising:
    parsing the first set of commands and generating parsed commands, and
    classifying the parsed commands and providing classified commands to the one or more command processors.

17. The method of claim 11, wherein the one or more command processors includes a special command unit configured to process a subset of commands of the second set of commands that is issued by the computing processor.

18. The method of claim 11, wherein the application is a machine learning (ML) application.

19. The method of claim 11, wherein each of the second set of commands includes a command identifier including a command unit identifier corresponding to the one or more command processors and a local tag that is mapped to the first set of commands by a lookup table.

20. The method of claim 11, further comprising providing a submission queue for queuing the second set of commands to the data storage device and a completion queue for queuing completion entries received from the data storage device.

* * * * *